UNITED STATES PATENT OFFICE.

WILLIAM A. HALL, OF BELLOWS FALLS, VERMONT.

WATER-PAINT.

SPECIFICATION forming part of Letters Patent No. 567,592, dated September 15, 1896.

Application filed August 26, 1895. Serial No. 560,565. (No specimens.)

*To all whom it may concern:*

Be it known that I, WILLIAM A. HALL, a citizen of the United States, residing at Bellows Falls, in the county of Windham and State of Vermont, have invented certain new and useful Improvements in Water-Paint; and I do hereby declare the following to be a full, clear, and exact description of the invention, such as will enable others skilled in the art to which it appertains to make and use the same.

This invention relates to improvements in water-paints, particularly that class in which the component parts are thoroughly commingled and put up in dry powder form in readiness for subsequent use by the addition of water.

This class of paints comprises generally a base of some earthy or mineral compound with an adhesive. My invention is embodied in the nature, as likewise in the treatment, of the adhesive, whereby said adhesive is first rendered soluble and, after being mixed with water and applied to the surface upon which it is to be placed, then oxidizes by exposure to the air and becomes insoluble. In this way I am enabled to make a waterproof paint, one that possesses the characteristics of an oil-paint in that it can be washed and withstand rain and exposure to the weather.

In the composition of this water-paint I propose to manufacture it as a white, dry powder, and to this end the base is composed, preferably, of silicate of magnesia or talc and the adhesive in the proportion of ninety (90) per cent. base and ten (10) per cent. adhesive. In lieu, however, of a single base other ingredients may be added, and I find that whiting may be employed with good results. When this substance is used, the base then consists, preferably, of fifty (50) per cent. of the talc and forty (40) per cent. of the whiting, with ten (10) per cent. of the adhesive, but these proportions may be varied according to the situation or the exposure to which the paint is to be subjected.

The adhesive is to be made from casein and lime. Casein is an organic glutinous substance obtained from skimmed milk, and is produced by coagulating skimmed milk with an acid. Under my invention I propose to heat the milk to 100° Fahrenheit, then add the acid, when the curd is thrown down. The whey is now drained off and the curd then rinsed. After that it is crumbled and drained out. This casein after evaporation and when reduced to powder is almost a pure white substance, not granular, but very fluffy, and preferably employed in this form to enable a more intimate mixture with the lime, because if the particles are in any way coarse the lime alkali is very slow in dissolving it. On the contrary it may be remarked that casein in its natural state is an amber-colored granular substance.

In the preparation and manufacture of this adhesive I take about sixty (60) per cent. of dry casein and mix it with about forty (40) per cent. of good dry slaked powdered lime. By experiment I have found that the lime which I employ is not used in any sense as a base, but merely to render the casein soluble in water. That is, the casein without being treated with lime or other alkali is ordinarily insoluble either in hot or cold water, but by means of the lime I produce a chemical reaction that results in a substance which is not only soluble in water, but after application to the surface on which it is laid becomes insoluble, due to oxidation. Now I find that any alkali will render the casein soluble, but lime from calcium or magnesia, the latter commonly known as "dolomite," alone appears to enter into a chemical combination to form an insoluble compound upon oxidation. With the other alkalies the casein is rendered soluble by treatment with said alkali, but when exposed to the air after being mixed with water still remains soluble, and consequently fails in the necessary requisite, that of being waterproof. With the above proportions of the base composed of fifty (50) per cent. of talc and forty (40) per cent. of whiting I add about ten (10) per cent. of the adhesive. Owing to the action of the lime on the casein a waterproof paint is formed. Furthermore, no antiseptic or other analogous materials are necessary to prevent it from decomposing or from smelling when decomposed.

This composition of matter when manufactured is a white dry powder, which is made into paint by mixing it with cold water. The above-mentioned ingredients when compounded produce a very smooth, fine, white paint, which may be colored, if so desired. This paint spreads very easily and smoothly, has no odor, and when dry becomes extremely hard and quite waterproof.

What I claim is—

1. A water-paint, composed of a mineral compound in powdered form, as a base, and an adhesive to form an insoluble compound by oxidation consisting of casein, and lime in the proportions, substantially as specified.

2. A dry powder, comprising talc as a base, and an adhesive formed of casein as specified, and a lime of calcium or magnesia, as set forth.

3. A water-paint consisting of a mineral compound in powdered form as a base, an adhesive composed of casein and oxid of calcium, and water, substantially as stated.

In testimony whereof I affix my signature in presence of two witnesses.

WM. A. HALL.

Witnesses:
EMERY H. ROGERS,
JAS. H. WILLIAMS, Jr.